United States Patent [19] [11] Patent Number: 5,855,813
Coles et al. [45] Date of Patent: Jan. 5, 1999

[54] LIQUID CRYSTAL MATERIAL AND LIQUID CRYSTAL DISPLAY DEVICE

[75] Inventors: Harry Coles, Highfield, United Kingdom; Kohki Takatoh, Yokohama, Japan; Philip Cox, Highfield, United Kingdom

[73] Assignee: Kabushiki Kaisha Toshiba, Kawasaki, Japan

[21] Appl. No.: 925,479

[22] Filed: Sep. 8, 1997

[30] Foreign Application Priority Data

Sep. 12, 1996 [GB] United Kingdom .................. 9619065

[51] Int. Cl.[6] .......................... C09K 19/54; C09K 19/52; G02F 1/13
[52] U.S. Cl. ................... 252/299.5; 252/299.01; 349/182
[58] Field of Search .............. 252/299.01, 299.5; 349/182

[56] References Cited

U.S. PATENT DOCUMENTS 5,455,697 10/1995 Coles et al. .......................... 359/103
5,547,604 8/1996 Coles et al. ........................ 252/299.01

OTHER PUBLICATIONS

Joanna Newton, et al., J. Mater. Chem., vol. 4, No. 6, pp. 869–874, "Synthesis and Properties of Low-Molar-Mass Liquid-Crystalline Siloxane Derivatives", 1994.

Mohammed IBN-Elhaj, et al., J. Phys. II France, vol. 3, ppl 1807–1817, "Sub-Layer Adequacy in Smetic Ordering: Structural Characterization of New Low Molar Mass Liquid-Crystalline Siloxanes", Dec. 1993.

*Primary Examiner*—Shean C. Wu
*Attorney, Agent, or Firm*—Oblon, Spivak, McClelland, Maier & Neustadt, P.C.

[57] ABSTRACT

The present invention is a liquid crystal material including a base crystal material, a compound represented by the following general formula (I) and/or a compound represented by the following general formula (II)

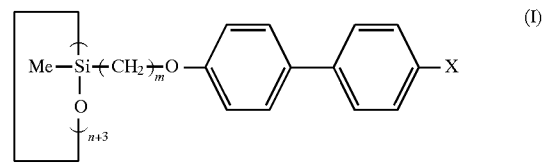

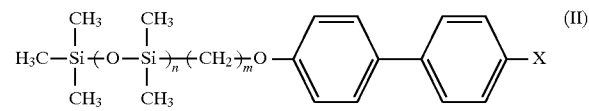

(where n is an integer of 0 to 10, m is an integer of 0 to 15, and x is cyano group or halogen).

11 Claims, 1 Drawing Sheet

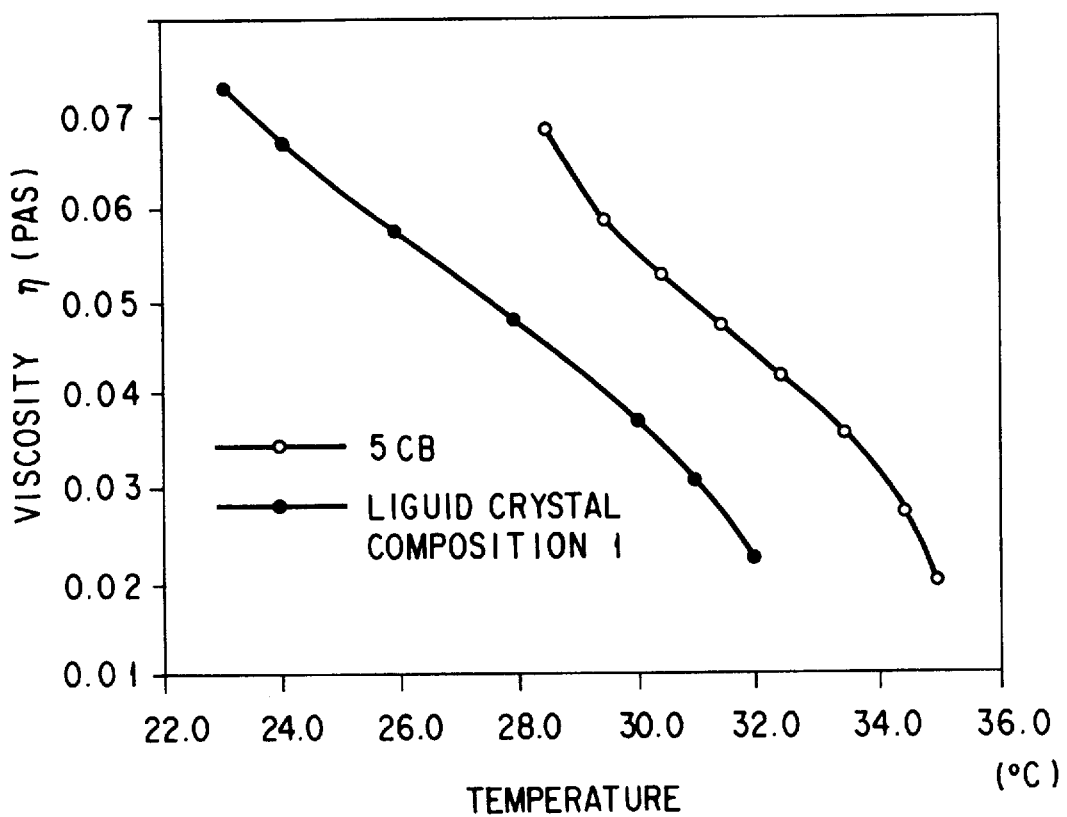
FIGURE

LIQUID CRYSTAL MATERIAL AND LIQUID CRYSTAL DISPLAY DEVICE

BACKGROUND OF THE INVENTION

The present invention relates to a liquid crystal material and a liquid crystal display device using the same.

In recent years, technologies for applying a liquid crystal display device to a color display have been developed. In case of applying a liquid crystal display device to a color display, the display device needs to be fast in response speed and, furthermore, low in threshold voltage (Vth).

It is known that a response time is in proportion to the product of a viscosity of a liquid crystal material and a square of a cell gap, and in order to make the response time shorter it is necessary to lower the viscosity of the liquid crystal material. On the other hand, the Vth is influenced by three kinds of basic transformational distortion (splay distortion, twist distortion, and bend distortion) of a liquid crystal material. Namely, the less the coefficients of elasticity (splay elasticity (K11), twist elasticity (K22), and bend elasticity (K33)) representing relation between distortion and stress are, the lower the Vth is, and therefore the coefficients of elasticity need to be lowered.

However, it is the present situation that a liquid crystal material according to the prior art is not low enough in viscosity and elasticity to make the response speed faster and the Vth lower, and the prior art cannot make a liquid crystal material low enough in viscosity and elasticity.

BRIEF SUMMARY OF THE INVENTION

The invention has been done in consideration of such problems, and an object of the invention is to provide a liquid crystal material capable of lowering its viscosity and elasticity, and a liquid crystal display device having a short response time and a low threshold voltage.

The invention provides a liquid crystal material comprising a base liquid crystal material and a compound represented by the following general formula and/or a compound represented by the following general formula:

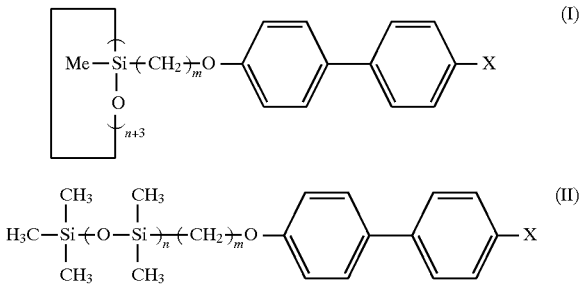

(where n is an integer of 0 to 10, m is an integer of 0 to 15, and x is cyano group or halogen).

And the invention provides a liquid crystal display device comprising a pair of substrates having an electrode film and a liquid crystal layer interposed between a pair of the substrates which are disposed so that the electrode films face each other, wherein the liquid crystal layer contains a compound represented by the above-mentioned formula and/or a compound represented by the above-mentioned formula.

This invention can be more fully understood from the following detailed description when taken in conjunction with the accompanying drawings, in which:

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, servo to explain the principles of the invention.

FIGURE is a characteristic diagram showing relation between viscosity and temperature.

DETAILED DESCRIPTION OF THE INVENTION

Embodiments of the invention are concretely described in the following.

A liquid crystal material of the invention is made by adding a compound represented by the above-mentioned formula (I) and/or a compound represented by the above-mentioned formula (II) to a base liquid crystal material. These compounds can make the base liquid crystal material lower in viscosity and elasticity by means of the function of the silicon group. And since these compounds do not have a bad influence upon the base liquid crystal material, a liquid crystal material of the invention can attain reduction in viscosity and elasticity as keeping specific characteristics of the base liquid crystal material. Concretely, the base liquid crystal material can be lowered by about 30% in viscosity and about 40% in elasticity ($K_{11}$ and $K_{22}$) by adding the above-mentioned compounds of 1% by weight to the base liquid crystal material.

In the invention, it is preferable that an amount of the above-mentioned compounds to be added to the base liquid crystal material is 0.01 to 20% by weight in consideration of thermal stability of the liquid crystal material.

In the invention, nematic liquid crystal, smectic liquid crystal, and the like can be used as a base liquid crystal material. Particularly, in consideration of the desired effect, it is desirable that the base liquid crystal material is nematic liquid crystal. And such display modes as TN (Twisted Nematic), STN (Super Twisted Nematic), PSCT (Polymer Stabilized Cholesteric Texture), PDLC (Polymer Dispersed Liquid Crystal), CT (Cholesteric Texture) and display modes using microcapsule of liquid crystalline materials with polymer material are mentioned as a display mode for a liquid crystal display device. Particularly, it is desirable that the display mode is a display mode capable of using a nematic liquid crystal material.

Next, embodiments of the invention which were made in order to clarify effects of the invention are described in the following.

(EXAMPLE 1)

A liquid crystal composition 1 was obtained by mixing 98% by weight of commercially available pentylcyanobiphenyl (5CB) with 2% by weight of a cyanobiphenyl liquid crystal compound having a pentamethyldisiloxane group.

A change of viscosity with temperature of a liquid crystal composition 1 and 5CB was measured, respectively, by a light scattering method (F. M. Leslie, C. M. Waters, Mol.

Cryst. 123, 101 (1985), H. J. Coles, M. S. Sefton, Mol. Cryst. Liq. Cryst. 123, 101 (1985) or 3, 63, (1986)). The results are shown in FIGURE. As is apparent from FIGURE, the viscosity of the liquid crystal composition 1 wherein the liquid crystal compound represented by the formula A was added was about 20% lower than that of 5CB alone over the whole temperature range.

An ITO film (transparent electrode film) having a thickness of 1000 angstrom was formed on the surface of a glass substrate using a sputtering method. Then, a ½ solution obtained by diluting Polyimide Optomer AL1051 (manufactured by Japan Synthetic Rubber Co., Ltd.) with a diluent ACT608 (manufactured by Japan Synthetic Rubber Co., Ltd.) was applied on the ITO using a spin coater. This glass substrate was introduced in an oven and subjected to a heating/drying treatment at 180° C. for 30 minutes to form a polyimide film (alignment film) having a thickness of 700 angstrom on the ITO film.

Then, the polyimide film was subjected to a rubbing treatment under a normal condition, using a stainless steel roller (having a diameter of 15 cm) fit with a cotton cloth. In such way, two glass substrates having a transparent electrode film and an alignment film were made.

A silica spacer having a particle size of 5 $\mu$m, Shinsikyu SW (manufactured by Shokubai Kagaku Co., Ltd.) was spread on the whole surface of the polyimide film of one glass substrate made as described above. Then, two glass substrates were arranged so that polyimide films face each other, and two glass substrates were laminated using an epoxy adhesive. In such way, two cells were made. Then, the liquid crystal composition 1 and 5CB was poured, respectively, between two glass substrates of the cell to make two liquid crystal display elements.

A rectangular wave having a driving voltage of 8 V was applied on each liquid crystal display element, and a rise time and a decay time were measured, respectively, by a change in transmitted light. Then, response characteristics were evaluated by the rise time and decay time. As a result, the rise time and decay time of the liquid crystal display element using the liquid crystal composition 1 (present invention) were 80 ms and 100 ms, respectively, and the response velocity was fast. On the other hand, the rise time and decay time of the liquid crystal display element using 5CB alone were 120 ms and 160 ms, respectively. Further, there was no difference on practical use in elastic modulus and threshold voltage between liquid crystal compositions 1 and 5CB.

(EXAMPLE 2)

A liquid crystal composition 2 was obtained by mixing 98% by weight of a commercially available STN liquid crystal LIXON 4032 (manufactured by Chisso Sekiyu Kagaku Co., Ltd.) with 2% by weight of a cyanobiphenyl liquid crystal compound having a pentamethyldisiloxane group represented by the formula A.

A change of viscosity with temperature of a liquid crystal composition 2 and 5CB was measured, respectively, by a light scattering method. As a result, the viscosity of the liquid crystal composition 2 wherein a liquid crystal compound represented by the formula A was added was about 20% lower than that of LIXON 4032 alone over the whole temperature range, similar to the case of Example 1.

According to the same manner as that described in Example 1, two cells were made. Then, the liquid crystal composition 2 and LIXON 4032 was poured, respectively, between two glass substrates of the cell to make two liquid crystal display elements.

A 65 $\mu$s pulse wave having a driving voltage of 30 V was applied on each liquid crystal display element, and a rise time and a decay time were measured, respectively, by a change in transmitted light. Then, response characteristics were evaluated by the rise time and decay time. As a result, the rise time and decay time of the liquid crystal display element using the liquid crystal composition 2 (present invention) were 180 ms and 200 ms, respectively, and the response velocity was fast. On the other hand, the rise time and decay time of the liquid crystal display element using the composition LIXON 4032 alone were 200 ms and 220 ms, respectively. Further, there was no difference on practical use in elastic modulus and threshold voltage between liquid crystal compositions 2 and LIXON 4032.

(EXAMPLE 3)

A liquid crystal mixture 3 was prepared by mixing 50% by weight of the liquid crystal composition 1 used in Example 1 with 50% by weight of an adhesive NOA65 (manufactured by Norland Optical Co.), and preserved overnight at a transition temperature (about 70° C.) of the liquid crystal to an isotropic liquid. On the other hand, a liquid crystal mixture 4 was prepared by mixing 50% by weight of 5CB used in Example 1 with 50% by weight of an adhesive NOA65, and preserved overnight at a transition temperature (about 70° C.) of the liquid crystal to an isotropic liquid.

Then, an ITO film (transparent electrode film) having a thickness of 1000 angstrom was formed on the surface of a glass substrate using a sputtering method. Then, a silica spacer having a particle size of 20 $\mu$m was spread on the whole surface of the ITO film of one glass substrate, and two glass substrates were arranged so that ITO films face each other to make two cells. Then, the liquid crystal mixtures 3 and 4 were poured into the cell thus obtained, respectively, and the polymer component in the liquid crystal mixture was cured by irradiating ultraviolet light to make liquid crystal display elements.

A rectangular wave having a driving voltage of 8 V was applied on each liquid crystal display element, and a rise time and a decay time were respectively measured by a change in transmitted light. Then, response characteristics were evaluated by the rise time and decay time. As a result, the rise time and decay time of the liquid crystal display element using the liquid crystal mixture 3 (present invention) were 100 ms and 122 ms, respectively, and the response velocity was extremely fast. On the other hand, the rise time and decay time of the liquid crystal display element using the liquid crystal mixture 4 (5CB alone) were 200 ms and 334 ms, respectively, and the response velocity was extremely slow.

(EXAMPLE 4)

A liquid crystal composition 4 was obtained by mixing 98% by weight of commercially available TN liquid crystal LIXON 5010 (manufactured by Chisso Sekiyu Kagaku Co., Ltd.) with 2% by weight of a cyanobiphenyl liquid crystal compound having a pentamethyldisiloxane group represented by the structural formula A.

A change of viscosity with temperature of a liquid crystal composition 4 and that of LIXON 5010 alone were measured, respectively, by a light scattering method. As a result, the viscosity of the liquid crystal composition 4 wherein the liquid crystal compound represented by the formula A was added was about 20% lower than that of LIXON 5010 alone over the whole temperature range.

Active elements (TFT) corresponding to pixels of 240× 640 were formed on the surface of a glass substrate. Then, a ½ solution obtained by diluting Polyimide Optomer AL1051 with a diluent ACT608 was applied on the substrate using a spin coater. This glass substrate was introduced in an oven and subjected to a heating/drying treatment at 180° C. for 30 minutes to form a polyimide film (alignment film) having a thickness of 700 angstroms on the ITO film.

Then, the polyimide film was subjected to a rubbing treatment under a normal condition, using a stainless steel roller having a diameter of 15 cm fitted with a cotton cloth. In such way, a transparent electrode film and an alignment film were formed on the glass substrate.

Then, color filters of RGB were formed on the surface of another glass substrate at the respective positions corresponding to the pixels on the above-mentioned substrate, and a smoothing treatment was applied not onto the substrate. Then, an ITO film (transparent electrode film) having a thickness of 1000 angstroms was formed on the substrate by means of a sputtering method, and a polyimide film (alignment film) was formed on the ITO film in the same manner as described above.

A silica spacer having a particle size of 5 microns, Shinsikyu SW was spread on the whole surface of the polyimide film of one of the glass substrates made as described above. Then, the two glass substrates were arranged so that the polyimide films face each other, and the two glass substrates were laminated together with each other using an epoxy adhesive. In such way, two cells were made. Then, the liquid crystal composition 4 and LIXON 5010 alone, respectively, were poured between the two glass substrates of the respective cells to made two liquid crystal display devices.

An axis of one polarizer of the polarizing plates arranged outside the liquid crystal display device is substantially parallel to a rubbing direction of the alignment film on the substrate. An axis of other polarizer of the polarizing plates is substantially perpendicular to the axis of one polarizer.

The resulting liquid crystal display devices were driven by a write signal of 60 Hz (16 ms in one frame) with a write time of 65 microseconds. At this time, a maximum signal voltage was set as 5 volts. In this case, as display performances, a contrast ratio was evaluated and it was examined whether the display device can display a half tone or not. The contrast ratio was obtained by measuring illuminance on the surface of the substrate, respectively, when applying and not applying a voltage to the liquid crystal display device, and calculating the ratio of the illuminance values. And the half tone display capability was examined by displaying a video-rate dynamic image.

As a result, both of the cells showed a contrast ration of 100:1 or higher and a good performance of displaying a half tone. However, in case of a liquid crystal display device using LIXON 5010 alone, a moving object in the image was seen as dragging. On the other hand, in case of a liquid crystal display device using a liquid crystal composition 4 (of the invention), such a phenomenon was hardly observed. The reason is thought to be that since a liquid crystal material of the invention contains a cyanobiphenyl liquid crystal compound having a pentamethyldisiloxane group, the liquid crystal material is made lower in viscosity to become faster in response speed.

In the above-mentioned embodiments, reduction in viscosity of a liquid crystal material on the invention has been explained, but a liquid crystal material of the invention can be also reduced in elasticity and thereby can make lower its threshold voltage Vth.

As described above, a liquid crystal material of the invention can be made lower in viscosity and elasticity, and a liquid crystal display device of the invention has a short response time and a low threshold voltage.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A liquid crystal material, comprising a base liquid crystal material, and a viscosity reducing agent having the formula (I) or formula (II) or both:

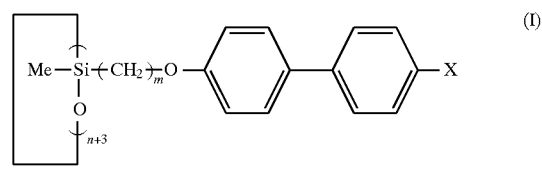

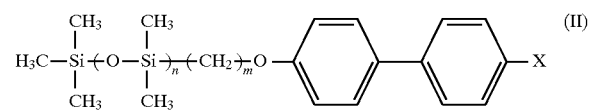

wherein n is an integer of 0 to 10; m is an integer of 0 to 15; x is a cyano group or halogen; and wherein the viscosity reducing agent is formulated in a proportion of from about 0.01 to 20% by weight.

2. The liquid crystal material of claim 1, wherein the base liquid crystal is one selected from the group consisting of STN liquid crystal, TN liquid crystal, polymer dispersion liquid crystal, PSCT liquid crystal, and microcapsule of liquid crystal material with polymer material.

3. The liquid crystal material of claim 1, wherein said viscosity reducing agent is used in an amount of 2% by weight.

4. The liquid crystal material of claim 3, wherein said viscosity reducing agent is a cyanobiphenyl liquid crystal compound having a pentamethyldisiloxane group.

5. The liquid crystal material of claim 1, which has a viscosity which is about 20% lower than that of said base liquid crystal material alone over a temperature range of about 28° to 32° C.

6. A liquid crystal display element, comprising a pair of substrates having an electrode film and a liquid crystal layer interposed between the pair of the substrates which are disposed so that the electrode films face each other, the liquid crystal layer containing a base liquid crystal material, and a viscosity reducing agent having the formula (I) or (II) or both:

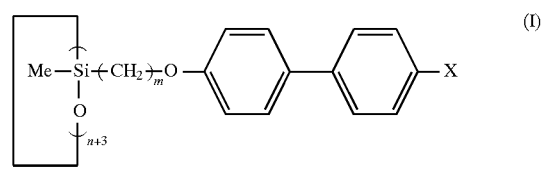

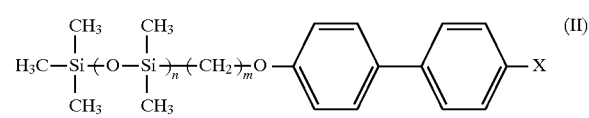

wherein n is an integer of 0 to 10; m is an integer of 0 to 15; x is a cyano group or halogen; and wherein the viscosity reducing agent is formulated in a proportion of 0.01 to 20% by weight.

7. The liquid crystal display element of claim 6, wherein the base liquid crystal is one selected from the group consisting of STN liquid crystal, TN liquid crystal, polymer dispersant liquid crystal, PSCT liquid crystal, and microcapsule of liquid crystal with polymer material.

8. The liquid crystal display element of claim 6, wherein an alignment film is formed on the electrode film.

9. The liquid crystal display element of claim 6, wherein said viscosity reducing agent is used in an amount of 2% by weight.

10. The liquid crystal display element of claim 9, wherein said viscosity reducing agent is cyanobiphenyl liquid crystal compound having a pentamethyl disiloxane group.

11. The liquid crystal material of claim 6, which has a viscosity which is about 20% lower than that of said base liquid crystal material alone over a temperature range of about 28° to 32° C.

* * * * *